Fig. 3.

Aug. 23, 1932.     M. NIGRO     1,873,626
SPRING CUTTING AND HOOKING MACHINE
Filed Sept. 23, 1930     6 Sheets-Sheet 5

Inventor:
Michel Nigro

Patented Aug. 23, 1932

1,873,626

UNITED STATES PATENT OFFICE

MICHEL NIGRO, OF WORCESTER, MASSACHUSETTS, ASSIGNOR TO SLEEPER & HARTLEY, INC., OF WORCESTER, MASSACHUSETTS, A CORPORATION OF MASSACHUSETTS

SPRING CUTTING AND HOOKING MACHINE

Application filed September 23, 1930. Serial No. 483,929.

The present invention relates to a machine for cutting a continuous helical wire coil into predetermined lengths and for forming hooks upon opposite ends of each individual spring thus formed.

The object of the invention is to provide an improved machine of the above indicated character which is entirely automatic in its operation, so that as a continuous helical wire coil is fed into the machine, a spring with hooked ends will be delivered at the completion of each operating cycle. The machine of the present invention is particularly characterized by an extremely effective mechanism for simultaneously forming hooks at opposite ends of each individual spring so that the finished coils will be uniform in character. The above and other advantageous features of the invention will hereinafter more fully appear with reference to the accompanying drawings in which—

Like reference characters refer to like parts throughout the drawings.

Referring to Figs. 1 to 4, inclusive, the machine comprises a table 1 providing bearings 2, 2 for supporting a drive shaft 3 to which power is applied in any suitable manner, as by means of a pulley 4. The power shaft 3 is connected by bevel gearing 5 to a cam shaft 6 extending at right angles to the shaft 3, which shaft 6 is adapted to drive and control the operation of the spring hooking devices which will be hereinafter described in detail. The drive shaft 3 is also connected by a bevel gearing 7 to a short shaft 8 which is adapted to impart intermittent rotative movement to a shaft 9 immediately above and parallel to the shaft 8 by means of a star wheel 10 and a crank pin, not shown, carried by the short shaft 8. The star wheel 10 and the crank pin carried by the shaft 8 constitute the well known Geneva stop motion which is, therefore, not shown or described in detail therein, its purpose being to impart an intermittent rotary movement to the shaft 9 such that it will be turned through a predetermined angle for each revolution of the drive shaft 3.

Figure 3:
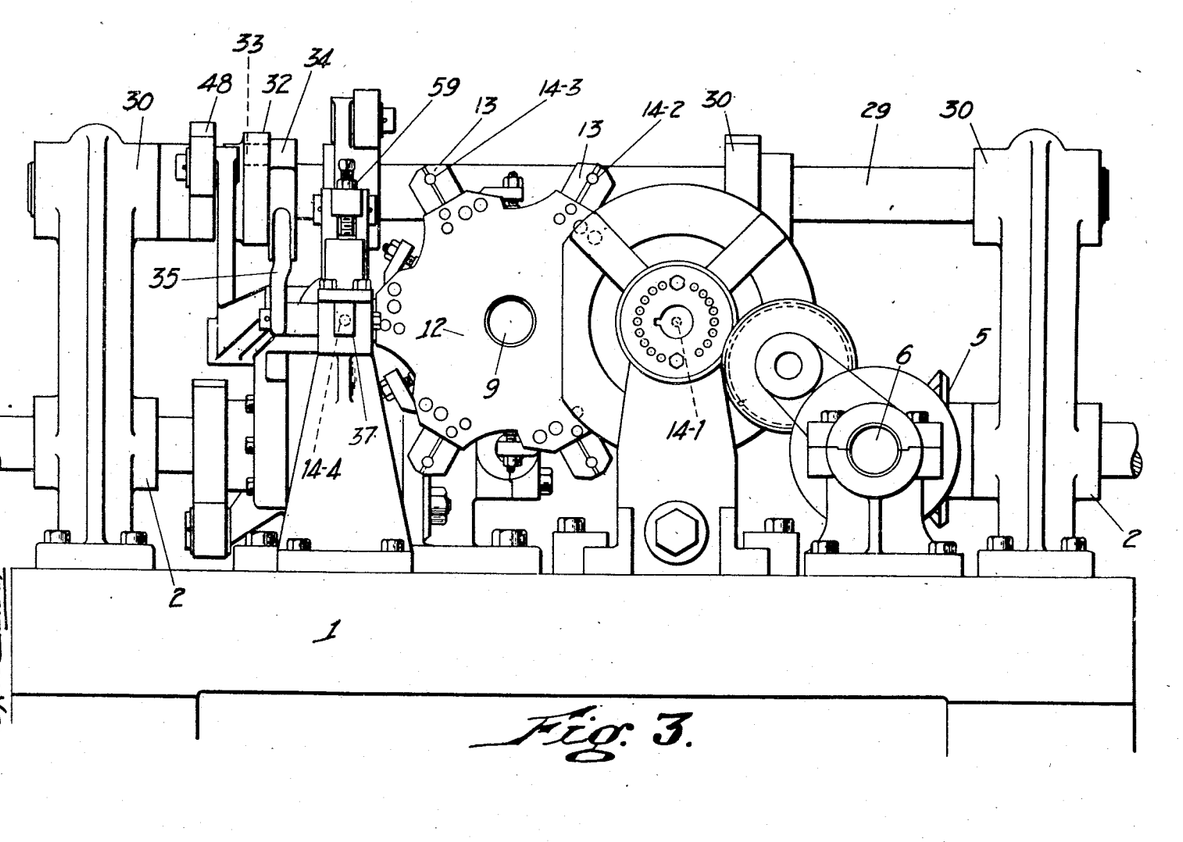
Fig. 3 is a view in end elevation of the machine shown in Fig. 1, looking from the right hand side.

The star wheel shaft 9 extends beyond a bearing 11 and carries at its projecting end a transfer wheel 12 which, as best shown in Fig. 3, carries a series of spring clamping devices 13 equally spaced around the wheel 12, in accordance with the angular displacement of the divisions of the star wheel 10. The spring clamping devices 13 are so arranged on the wheel 12 that when the wheel is at rest, it is adapted to maintain one of the clamping devices 13 in alinement with the spring feeding mechanism, another of the clamping devices in alinement with the spring hooking mechanism, and the third clamping device in alinement with the spring ejecting mechanism, the operative parts of the machine being adapted to simultaneously perform the three operations of feeding a spring to the wheel 12, forming hooks upon opposite ends of a spring previously fed to the wheel, and ejecting a completed hooked spring from the wheel.

Figures 1, 1A:
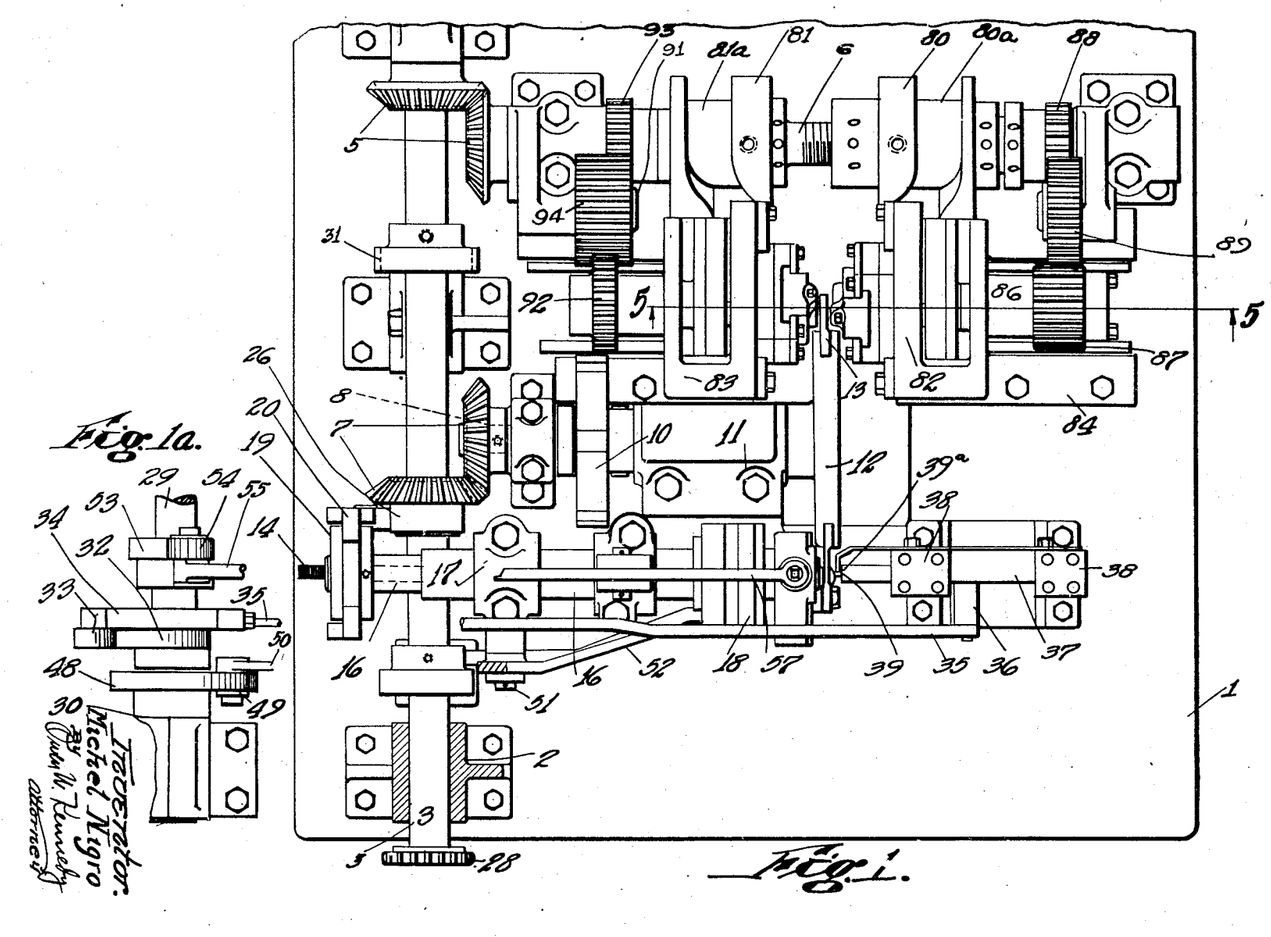
Fig. 1 is a plan view of a machine embodying the invention.
Fig. 1a is a plan view of a portion of the parts shown broken away in Fig. 1.
Figure 2:
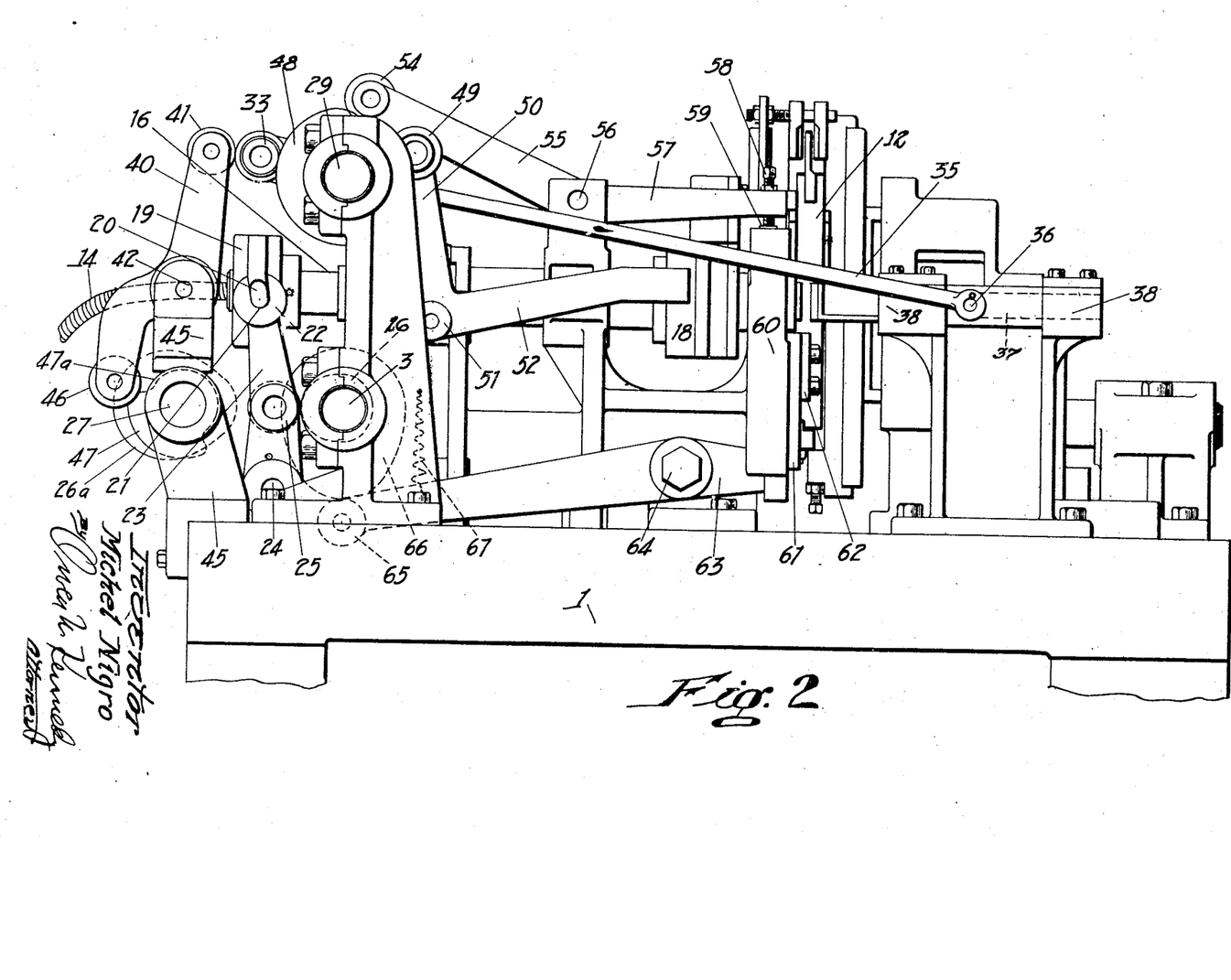
Fig. 2 is a view in side elevation of the machine shown in Fig. 1.

As best shown in Figs. 1 and 2, a continuous helical wire coil 14 is led into the machine through an opening 15 provided in a hollow sleeve 16 that is mounted for longitudinal movement in bearings 17 and carries at its inner end a spring feeding chuck 18, the details of which will be hereinafter described. The outer end of the sleeve 16 carries a collar 19 providing projecting pins 20 which are seated in notches 21 provided in the forked portion 22 of a lever 23 pivotally supported at 24 on the table 1. The lever 23 carries intermediate its ends a roll 25 which is in engagement with a cam 26 mounted on the hub of the gear 7 on shaft 3, see Fig. 1. The roll 25 is also adapted to be actuated by a second cam 26a mounted on a countershaft 27 extending parallel to the power shaft 3 and driven at the same speed as the power shaft 3 through gears 28, see Fig. 4. The cams 26 and 26a are so formed that for each revolution of the drive shaft 3, a complete forward and rearward movement is imparted to the coil feeding sleeve 16, which movement is adapted to cause the chuck 18 to feed a predetermined length of the continuous coil 14 to the transfer wheel 12 and to return for a new feed. As shown in Fig. 2, the cam 26 holds the sleeve 16 in its retracted or rearward position.

Figure 4:
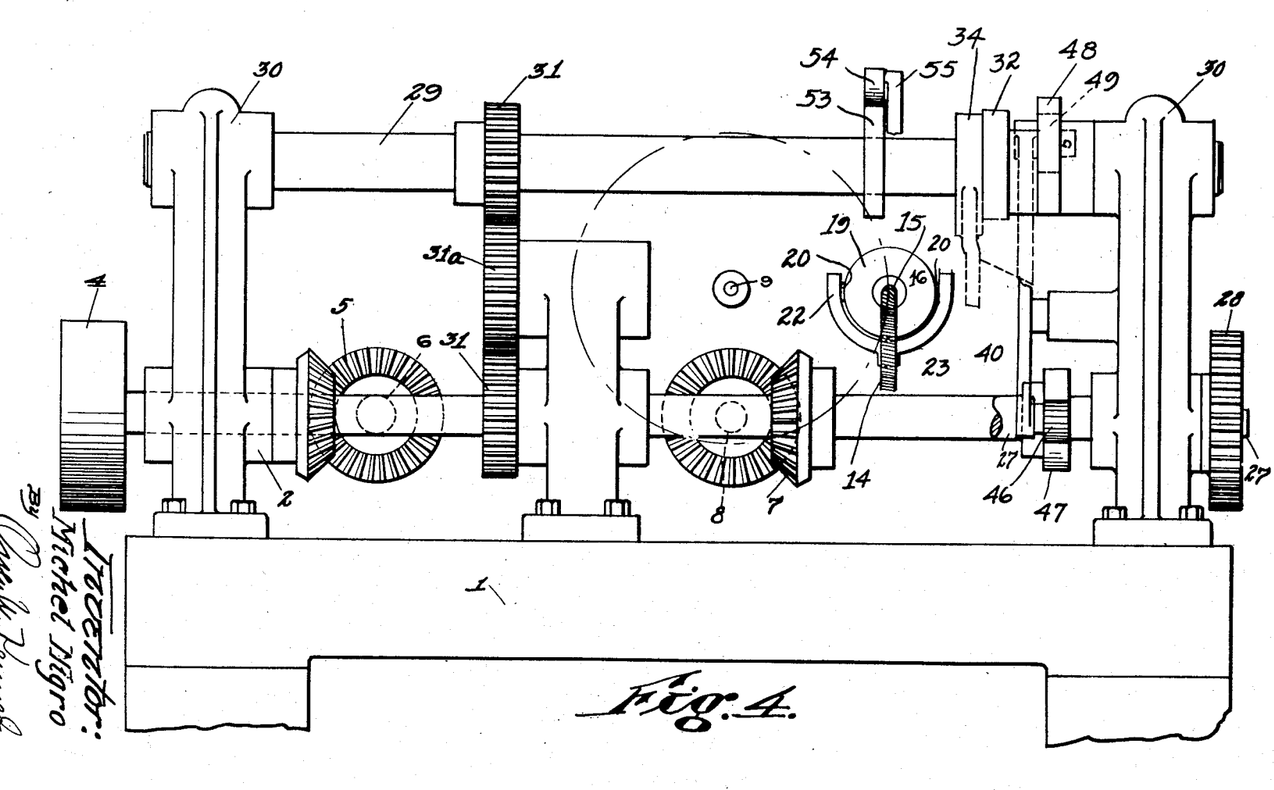
Fig. 4 is a view in side elevation of the parts shown in Fig. 1, looking from the left hand side.
Figure 8:
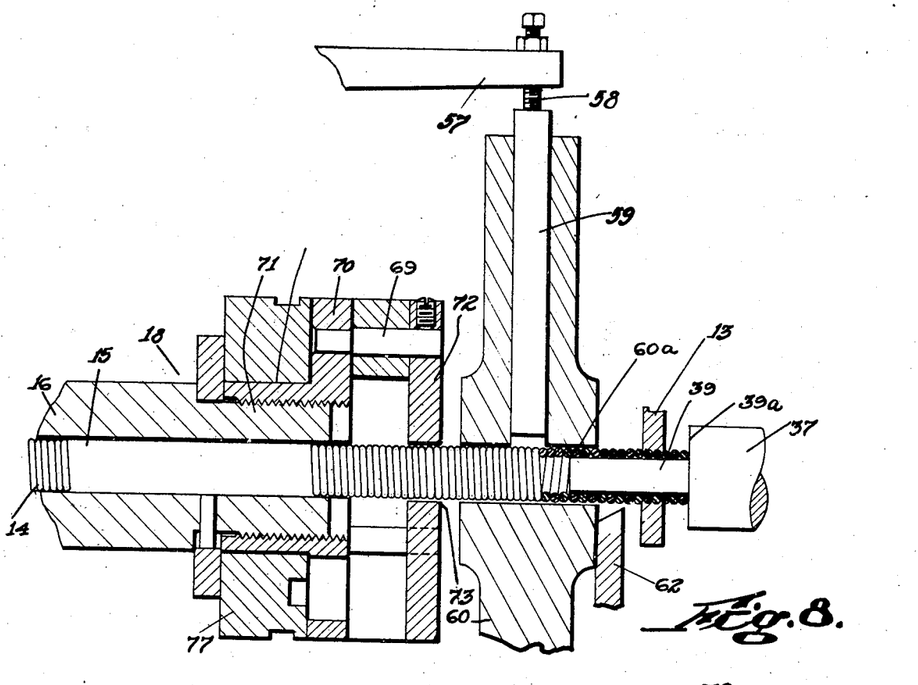
Fig. 8 is a sectional view along the line 8—8 of Fig. 7, looking in the direction of the arrows, and showing the spring clamping means.

As best shown in Fig. 4, a second cam shaft 29 is supported in bearings 30, 30 above and parallel to the drive shaft 3, this cam shaft 29 having been broken away in Fig. 1 so as to show more clearly the various elements driven from the shaft 3. The cam shaft 29 is driven at the same speed of rotation as drive shaft 3 by spur gears 31, an idler gear 31a being interposed between the gears 31 so as to cause the shaft 29 to turn in the same direction of rotation as the shaft 3. As best shown in Fig. 1a, which is laterally displaced from Fig. 1 with corresponding parts in alinement, the shaft 29 carries a cam 32 which is adapted to be engaged by a roll 33 carried at the end of a fork 34 which embraces the shaft 29. The other end of the fork 34 is connected to a rod 35 which extends downwardly past the chuck 18 and is pivotally connected at its lower end to a pin 36 projecting laterally from a cut-off arbor 37 slidably mounted in bearings 38, 38. The inner end of the arbor 37 provides a reduced portion or cutting nose 39, the diameter of which is such that it will be freely received within the coil 14, and the cam 32 acting through the roll 33 is adapted to cause the rod 35 to move the arbor 37 inwardly so that the nose 39 will be received within the end convolutions of the coil prior to the cutting operation. The shoulder 39a at the end of the nose 39 serves to limit movement of the coil as it is fed into a clamping device 13 carried by the transfer wheel 12, as best shown in Fig. 8.

Movement of the arbor 37 in the opposite direction so as to withdraw the nose 39 from the clamping device 13, following the cutting operation and before the transfer wheel 12 is turned, is accomplished by means of a lever 40 carrying at its upper end a roll 41 in engagement with the roll 33 on the fork 34. The lever 40 is pivoted at 42 on a bracket 45 and its lower end carries a roll 46 adapted to be engaged by the surface of a cam 47 mounted on the shaft 27. The cam 47 is cut away at 47a so that the roll 41 on the lever 40 does not interfere with movement of the roll 33 by the cam 32 to move the arbor 37 into the cutting position. However, when the surface of the cam 32 falls away from the roll 33 the arbor 37 remains stationary until the rise of the cam 47 imparts turning movement to the lever 40 which engages the roll 41 with the roll 33 to withdraw the arbor 37. In Fig. 1 the arbor 37 is shown with its nose 39 in the forward, or cutting position, and it is obvious from Fig. 2 that further rotation of the shaft 27 in a clockwise direction will cause the lever 40 to withdraw the arbor 37.

The shaft 29 also carries a cam 48, the surface of which is in engagement with a roll 49 carried by one arm 50 of a bell crank lever pivoted at 51. The other arm 52 of this lever extends in the direction of the chuck 18 and turning movement of the arm 52 by the cam 48 and roll 49 is adapted to operate the jaws of the chuck in a manner to be hereinafter described. The shaft 29 also carries a third cam 53, the surface of which is adapted to be engaged by a roll 54 carried by one arm 55 of a lever pivoted at 56, see Fig. 2. The other arm 57 of this lever is connected by means of an adjustable stud 58 to a plunger 59 vertically movable in a guide 60 extending upwardly from the table 1 just beyond the chuck 18. The function of this plunger 59 is to forcibly engage the end convolutions of the coil 14, after a cutting operation, so that the coil 14 will not be drawn backward when the sleeve 16 is returned by the rocking lever 23 preparatory to feeding another length of coil by the chuck. The guide 60 also serves to support a vertically movable slide 61 carrying a knife 62 that is adapted to cooperate with the nose 39 of the arbor 37 to sever a coil in the manner hereinafter to be described. The slide 61 with the knife 62 is adapted to be given a reciprocatory movement by means of a lever 63 pivoted at 64 with its free end carrying a roll 65 held in engagement with the surface of a cam 66 carried on the drive shaft 3 by means of a spring 67, the cam 66 imparting upward movement to the knife 62.

Figure 7:
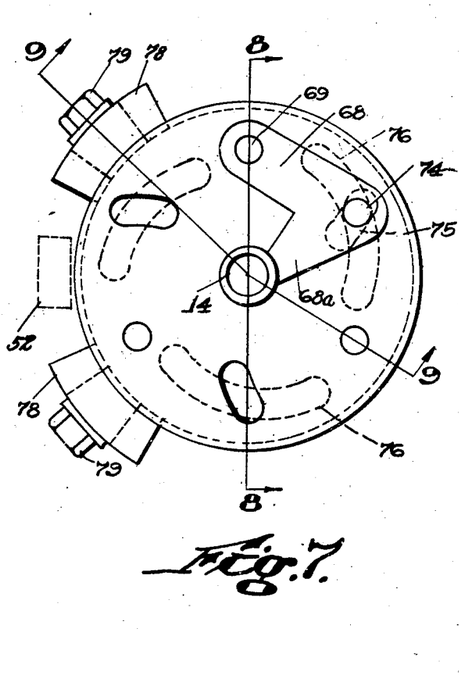
Fig. 7 is a fragmentary view looking at the end of the coil feeding chuck.
Figure 9:
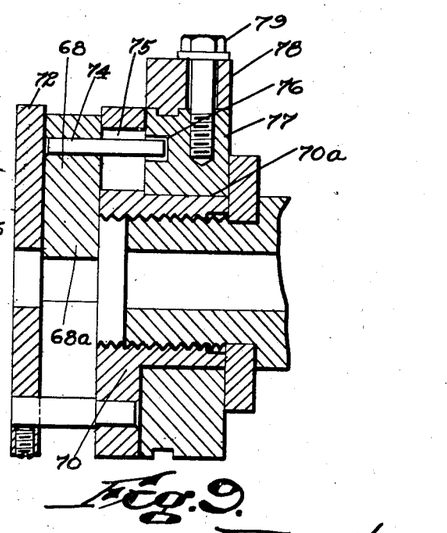
Fig. 9 is a sectional view along the line 9—9 of Fig. 7, looking in the direction of the arrows.

Having described the several general motions actuated by the drive shaft 3 for feeding the continuous coil 14 and severing it in predetermined lengths for positioning on the transfer wheel 12, there will next be described the details of construction of the chuck 18 together with details of the coil cutting mechanism. As best shown in Figs. 7, 8 and 9, the chuck 18 comprises a plurality of jaws 68 symmetrically arranged about the axis of the opening 15 in the sleeve 16 through which the continuous coil 14 is led to the chuck. Each jaw 68 is pivotally supported on a pin 69 carried by a ring 70 screwed onto a threaded reduced portion 71 of the sleeve 16. The several pins 69 for the jaws 68 serve to position an annular face plate 72 in front of the jaws, which plate provides an opening 73 through which the coil 14 extends. Each jaw 68 also provides an actuating pin 74 which, as best shown in Fig. 9, extends loosely through a slot 75 provided in the ring 70 which carries the pivot pin 69, the slot 75 having its center of curvature along the axis of the corresponding pivot pin 69. The inner end of each actuating pin 74 is received in a curved actuating slot 76 provided in the face of an operating ring 77 loosely mounted on a reduced portion 70a of the pivot carrying ring 70. Each slot 76 is eccentric about the axis of the coil opening 15 so that angular movement of the ring 77 will cause each jaw 68 to be turned about its pivot pin 69.

As shown in Fig. 7, the curvature of each slot 76 is such that angular movement of the ring 77 in a counterclockwise direction will cause the several pins 74 to simultaneously turn the jaws 68 in a clockwise direction about their pivots 69, thereby moving gripping portions 68a of the jaws, in unison, toward the axis of the sleeve 16 so as to engage the outer surface of the coil 14. Obviously, angular movement of the ring 77 in the opposite direction will simultaneously turn the jaws 68 in the opposite direction to release the coil 14. As previously pointed out, the free end of the lever arm 52 is adapted to operate the chuck 18 and for this purpose the ring 77 provides a pair of stops 78 secured to the outside of the ring 77 by bolts 79. As indicated in dotted lines in Fig. 7, the end of the lever arm 52 is received between the stops 78 so that angular movement of the lever arm 52 causes it to engage one or the other of the stops 78 and thereby turn the ring 77. The cam 48 which operates the arm 50 of this lever through the roll 49 is so timed as to cause the lever arm 52 to turn the ring 77 and thereby engage the jaws 68 with the coil 14 just prior to the beginning of the feeding movement imparted to the sleeve 16 by the lever 23 operated by the cam 26. Therefore, as the sleeve 16 carrying the chuck assembly 18 moves towards the transfer wheel 12, the jaws 68 will firmly grasp the coil 14 and feed it forward a predetermined amount into a clamping device 13 on the wheel 12.

As previously pointed out, the rod 35 is adapted to impart an inward movement to the arbor 37 upon operation of the cam 32 and the cam 32 is so timed that the nose 39 of the arbor 37 is moved forward into the position shown in Fig. 8 just before the sleeve 16 starts its forward movement to feed the coil into the clamping device 13, by the action of the gripping jaws 68, described above. After the nose 39 has been so positioned and the coil fed, the lever 57 is operated by the cam 58 so as to move the plunger 59 downwardly in the guide 60 to clamp the coil. After this, the lever 63 is operated by cam 66 to cause the knife 62 to sever a coil of wire from a continuous length by its cooperation with the cutting nose 39 of the arbor 37, as indicated in dotted lines in Fig. 8. This cutting operation leaves a coil of wire of predetermined length held in the clamping device 13 of the transfer wheel 12, whereupon the knife 62 is drawn downwardly by the pull of the spring 67.

As soon as a coil has been severed by operation of the knife 62, the arbor 37 is moved away from the wheel 12, thereby withdrawing the nose 39 from the severed coil which is then held entirely free of the arbor 37 by the clamping device 13. This withdrawal of the arbor 37 is accomplished by means of the roll 41 on the lever 40 engaging the roll 32 on the arbor operating rod 35, thereby insuring a rapid and positive withdrawal of the arbor nose 39. After this, continued rotation of the drive shaft 3 turns the star wheel 10 through one division, thereby carrying the spring one step toward the hooking mechanism and bringing an empty clamping device 13 into register with the sleeve 16, so that it will receive the advancing end of the coil upon the next forward movement of the sleeve 16.

Just after the coil is clamped by the plunger 59, the gripping jaws 68 are opened and the sleeve 16 is moved away from the transfer wheel. Therefore, the continuous coil 14 is held stationary with respect to the moving sleeve 16, and it will be impossible for the coil 14 to move rearwardly with the sleeve 16 upon the withdrawal thereof preparatory to its next coil feeding movement. Consequently, when the cam 26a again turns the lever 23 to move the sleeve 16 toward the transfer wheel 12, with the jaws 68 gripping the coil, the coil is fed forward through the guide 60 into the empty clamping device 13 exactly the same amount as was the preceding coil, the locking plunger 59 having been moved upwardly in advance of the coil feeding movement of the sleeve 16.

From the foregoing description it will be apparent then that for each complete revolution of the drive shaft 3, a predetermined length of wire will be fed beyond the guide 60 into a clamping device 13 and will then be severed by the knife 62 cooperating with the nose 39 of the arbor 37 positioned within the forward portion of the coil. Following this, the transfer wheel 12 will be turned through one complete step, the cutting nose 39 then having been withdrawn to permit turning of the wheel 12. It will be evident then from a consideration of Fig. 3 that after the transfer wheel 12 is turned through three steps, the coil designated 14—1, shown in dotted lines, will be carried into a position to be operated upon by the hooking mechanism, while the second and third coils designated 14—2 and 14—3, respectively, will be positioned part way between the feeding and cutting mechanism and the hooking mechanism. Continued operation of the machine from this point will cause the end convolutions of the coil 14—1 to be turned back to provide hooks, while a fourth coil 14—4 is severed from the continuous coil 14, and the operation of the spring hooking mechanism will now be described in detail.

Figures 5, 6, 10, 10A, 10B, 10C:
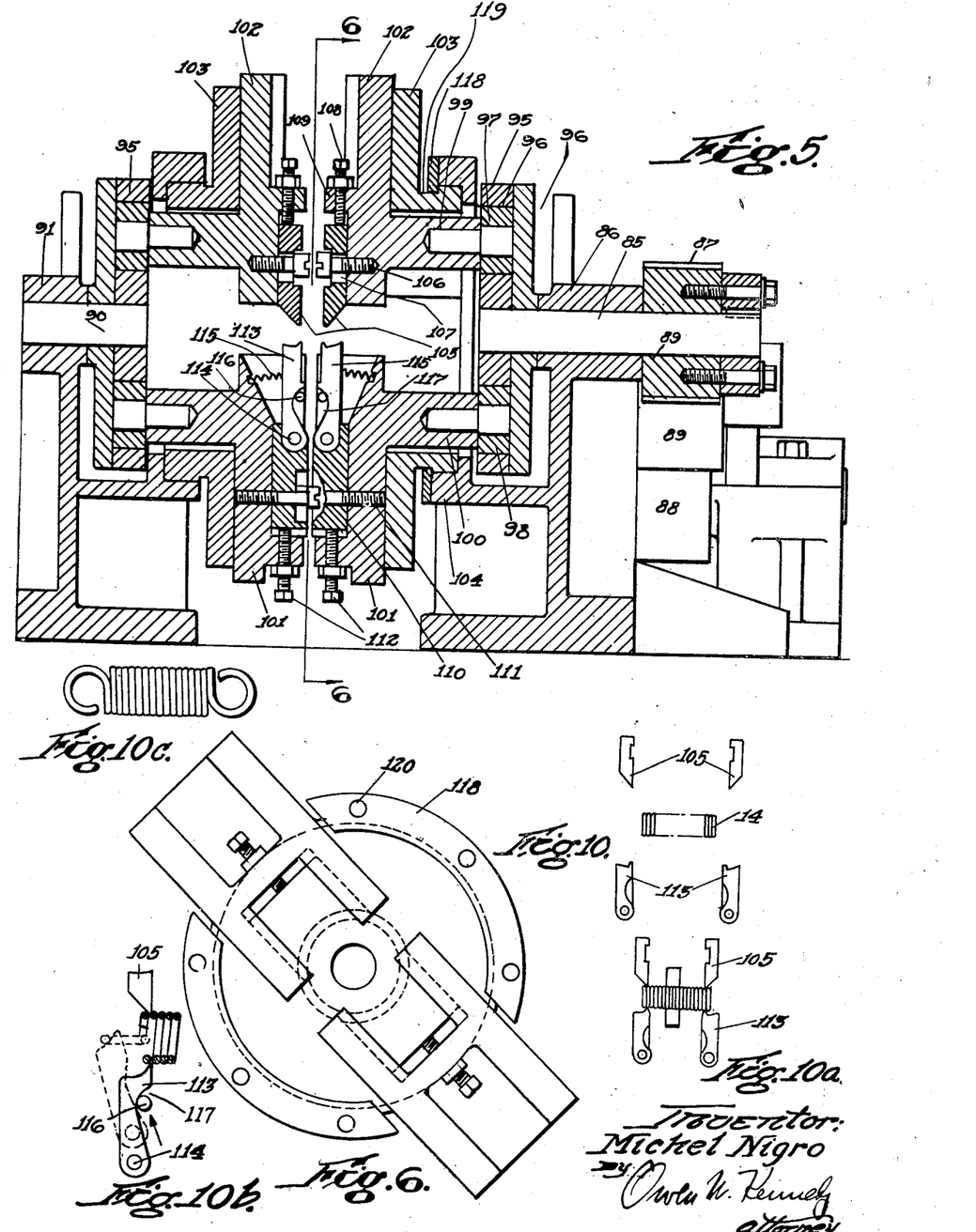
Fig. 5 is a vertical sectional view along the line 5—5 of Fig. 1, looking in the direction of the arrows, the parts being shown on an enlarged scale.
Fig. 6 is a fragmentary sectional view along the line 6—6 of Fig. 5, looking in the direction of the arrows.
Figs. 10, 10a and 10b are diagrammatic views illustrating the formation of hooks at the end of a spring.
Fig. 10c is a plan view of a completed spring as produced in this machine.

As previously described with reference to Fig. 1, the cam shaft 6 for controlling the hooking mechanism is driven directly from the drive shaft 3 through the bevel gearing 5. For the purpose of operating the hooking mechanism, the shaft 6 carries cams 80 and 81 that are adapted to impart reciprocatory movement to heads 82 and 83 mounted on suitable ways 84 extending parallel to the axis of the shaft 6. The cams 80 and 81 provide tracks 80a and 81a, respectively, which receive rolls, not shown, carried by the heads 82 and 83, so as to cause the heads to separate to permit the transfer wheel 12 to position a spring between them and then to approach each other for the spring hooking operation. As best shown in Figs. 1 and 5, the head 82 provides a shaft 85 journalled in a bearing 86 and carrying a pinion 87 in mesh with a gear 88 on the cam shaft 6 with an idler gear 89 interposed between the gears 87 and 88 having its teeth of greater width than the teeth of the other gears to insure driving of the shaft 85 when the head 82 is moved by the cam 80. The head 83 is similarly provided with a shaft 90 journalled in a bearing 91 and carrying a spur gear 92 driven from a gear 93 on the shaft 6 by an idler gear 94, wider than the gears 92 and 93. Thus each head 82 and 83 is adapted to have rotative movement imparted thereto simultaneously with its axial movement.

As best shown in Figs. 5 and 6, each shaft 85 and 90 carries at its inner end a disk 95 providing a cam groove 96 for receiving rolls 97 and 98 mounted on arms 99 and 100 projecting from slides 101 and 102. The slides 101 and 102 are vertically movable on a guide 103 supported by a circular bracket 104 forming part of the casting with which the bearing 86 is formed. The upper slide 102 carries a bending finger 105 adjustably secured thereto by means of a bolt 106 received within an elongated slot 107. The upper end of the finger 105 abuts the lower end of a stud 108 threaded in a lug 109 provided by the slide 102 so as to permit close adjustment of the finger 105 and support the same against any upward thrust. The left hand shaft 90 carries a cam disk 95 for operating slide 102 carrying a finger 105 mounted in the same manner as the right hand finger.

The lower slide 101 of each head carries an adjustable block 110 clamped to the slide 101 by means of a bolt 111 and held against downward displacement by means of a stud 112. The block 110 carries a finger 113 opposed to the finger 105 and turnable on a pin 114 carried by the upper end of the block 110, so that each finger 113 is capable of turning movement on the block 110. The other head provides a similar slide 101 carrying a pivotally mounted finger 113 so that a second pair of fingers 105 and 113 are opposed to each other, spaced from the first pair of fingers 105 and 113. It will be noted, however, that the pointed end portions of the fingers 105 face in opposite directions, while the notched end portions of the fingers 113 are oppositely disposed.

As previously pointed out, turning of the cam shaft 6 is adapted to cause the cams 80 and 81 to separate the finger carrying slides 101 and 102 so as to permit the transfer wheel 12 to carry a severed spring held in the clamping device 14 into a position between the slides, the spring then appearing as in the fragmentary showing of Fig. 10. The slides 101 and 102 are then moved towards each other in unison to position the pointed ends of the fingers 105 and 113 in alinement with the end convolutions of the spring. As the slides 101 and 102 reach their point of nearest approach in the direction of the coil axis, the cam disks 95 operating through the rolls 97 and 98 cause the slides 101 and 102 to simultaneously move toward the axis of the coil, thereby bringing the fingers 105 and 113 into engagement with the end convolutions of the coil, as indicated in Fig. 10a.

As previously described, the fingers 113 are pivotally mounted on the slide blocks 111 and, as best shown in Fig. 5, springs 115 normally press the fingers 113 against fixed pins 116 projecting into recesses 117 formed in the fingers 113. Consequently, when a slide 101 is moved toward the axis of the coil, the pin 116 exerts a camming action on the surface of the recess 117 which causes turning of the finger 113 on its pivot 114. This action is illustrated in dotted lines in Fig. 10b from which it is evident that each finger 113 is adapted to bend the end convolution of the coil at right angles to the remainder of the coil. As this bending occurs, the upper finger 105 of the same pair is moved further inwardly towards the axis of the coil, as indicated in dotted lines, thereby positioning the diametrically opposite point of the end convolution transversely across the end of the coil. Obviously, the same action of the fingers 105 and 113 takes place simultaneously at both ends of the spring so that similar hooks are formed at opposite ends of the spring, as indicated in Fig. 10c. As the hook bending operation on the spring is completed, the heads separate and the fingers 105 and 113 are moved away from the coil, so that the completed hooked spring is held free by the transfer wheel. The wheel thereupon makes another step to remove a completed spring from between the hooking fingers 105 and 113, whereupon an unhooked spring is positioned between the separated fingers and the cycle of operations, which results in the formation of the hooks, is repeated.

It will be seen from Figs. 1 and 6 that the guides 103 are angularly adjustable on the circular brackets 104, so that the hooks formed on each spring, as described above, may be at different angles with respect to the axis of the coil, as desired. In order to hold each guide 103 in its adjusted position, a clamping plate 118 is provided which is attached to the annular face 104a of a bracket 104 with its inner edge received in a groove 119 provided in the guide 103, see Fig. 5. Loosening the bolts 120 which attach the plate 118 to the bracket 104 permits the guide 103 with its finger slides 101 and 102 to turn about the axis of the coil, and obviously the two pairs of fingers may be caused to engage the end convolutions of a coil at angularly displaced points.

From the foregoing it is apparent that each revolution of the drive shaft 3 will cause a predetermined length of continuous coil to be fed into the transfer wheel and then severed, while a previously cut spring is having its end convolutions bent outwardly to form hooks at the other side of the transfer wheel. Therefore, as long as the drive shaft continues to operate a completely hooked spring of predetermined length will be delivered by the transfer wheel for each revolution of the shaft.

I claim:

1. In a machine of the class described, mechanism for feeding a continuous helical spring comprising a reciprocatory head through which the spring passes, pivoted jaws carried by said head for movement at right angles to the axis of said spring, means for moving said jaws inwardly towards the spring to engage and feed the same as the head moves in one direction and means for releasing said jaws and for positively separating said jaws from said spring before the head moves in the opposite direction.

2. In a machine of the class described, in combination, a reciprocatory head adapted by its movement in one direction to engage a continuous helical spring passing therethrough and feed it a predetermined amount, an arbor adapted to receive and support the end convolutions of said spring as it is fed, a reciprocatory knife adapted to sever the length of spring thus fed and means for clamping said spring before said knife operates and before said head begins its movement in a direction opposite to the feeding movement.

3. In a machine of the class described, the combination with means for feeding a continuous helical spring, means for severing springs of predetermined length therefrom and means for presenting said individual springs one by one in a given position, of a pair of fingers adapted to engage the end convolution of a spring and means for imparting a combined shifting and pivotal movement to said fingers to bend the end convolution into a hook.

4. In a machine of the class described, the combination with means for feeding a continuous helical spring, means for severing springs of predetermined length therefrom and means for presenting said individual springs one by one in a given position, of a pair of heads carrying fingers adapted to engage the end convolutions of a spring and bend them into hooks at the ends of the spring, said heads being angularly adjustable to determine the relation of said hooks.

5. In a machine of the class described, the combination with means for feeding a continuous helical spring, means for severing springs of predetermined length therefrom and means for presenting said individual springs one by one in a given position, of a pair of heads carrying fingers adapted to engage the end convolutions of a spring and bend them into hooks angularly displaced with respect to the axis of the spring, said heads being angularly displaced relative to each other.

MICHEL NIGRO.